(12) United States Patent
Love et al.

(10) Patent No.: US 8,234,956 B2
(45) Date of Patent: Aug. 7, 2012

(54) PISTON ACTUATED SPLIT INPUT TRANSMISSION SYNCHRONIZER

(75) Inventors: Kraig M. Love, Dahinda, IL (US); John M. Seipold, Glasford, IL (US); Glen P. Calvert, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 726 days.

(21) Appl. No.: 12/347,972

(22) Filed: Dec. 31, 2008

(65) Prior Publication Data

US 2010/0162849 A1 Jul. 1, 2010

(51) Int. Cl.
*F16H 47/00* (2006.01)
(52) U.S. Cl. .......................................... 74/718
(58) Field of Classification Search .................. 74/718, 74/665 R, 666 A, 666 F, 665 L, 665 GA, 74/665 GB, 665 GC, 665 GD, 665 GE, 339, 74/664; 477/37, 38, 44; 475/207, 210, 211, 475/212, 213, 214, 215, 216, 217; 192/53.34, 192/69.91, 85.18, 30 W, 53.1
See application file for complete search history.

(56) References Cited

U.S. PATENT DOCUMENTS

| | | | |
|---|---|---|---|
| 5,048,655 A * | 9/1991 | Seeba | 477/175 |
| 5,795,263 A * | 8/1998 | Harries | 477/113 |
| 7,198,143 B2 * | 4/2007 | Legner | 192/53.34 |
| 7,278,951 B2 * | 10/2007 | Fuller | 476/9 |
| 2002/0096416 A1 * | 7/2002 | Otto | 192/85 CA |
| 2003/0178279 A1 * | 9/2003 | Drexl et al. | 192/85 CA |
| 2006/0019797 A1 | 1/2006 | Smith et al. | |
| 2006/0276291 A1 | 12/2006 | Fabry et al. | |
| 2008/0027614 A1 | 1/2008 | Field et al. | |

* cited by examiner

*Primary Examiner* — David D Le
*Assistant Examiner* — David J Hlavka
(74) *Attorney, Agent, or Firm* — Leydig, Voit & Mayer

(57) ABSTRACT

A piston actuated synchronizer system for a split torque transmission where the piston is attached directly to the synchronizer shift collar on the synchronizer centerline to provide the required actuation in a small volume of space and resolve fork and rod deflection issues seen on other synchronizers that use such a system. The piston is pressure applied and spring released. This design also uses a displacement sensor to monitor synchronizer engagement.

11 Claims, 4 Drawing Sheets

PISTON ACTUATED SPLIT INPUT TRANSMISSION SYNCHRONIZER

TECHNICAL FIELD

This patent disclosure relates generally to multiple range transmissions and, more particularly to a split input continuously variable transmission that provide multiple ratio ranges and uses one or more synchronizers when shifting between ranges.

BACKGROUND

Because of the limited speed range of most prime mover devices, e.g., engines, motors, etc., such devices are frequently used in conjunction with a transmission to provide a range of transmission input-to-output ratios, e.g., 3-to-1, 1-to-1, or 1.5-to-1 (overdrive). Certain ratios provide lower torque at higher speed, while other ratios provide higher torque for lower speed, i.e., during acceleration or hill climbing. Such discrete ratio transmissions, while useful and ubiquitous, cause discontinuities during operation that may be disconcerting or otherwise disruptive. As such, continuously variable transmissions (CVTs) have been developed to allow smooth acceleration without sharp discontinuities between ranges, and such transmissions are now in widespread use. However, while CVT transmissions do not require shifts between discrete ratios, they do generally require shifts between ratio ranges. For example, a first ratio range may allow transmission ratios from 3-to-1 up to 2-to-1, while a second range may allow transmission ratios from 2-to-1 and 1-to-1. In order to provide ratios from 3-to-1 up to 1-to-1, therefore, a range shift will be needed.

While existing systems use fork activated shifting with some success, this type of activation is not optimal for every configuration, due to space constraints. Moreover, fork activated shifting systems impose maintenance and replacement requirements due to the action of spinning transmission components against the shift forks. However, the shift forks also serve to gauge the position of the transmission components and the completion of each shift. Thus, the industry has experienced difficulty in attempting to design a split path CVT shifting system that provides the benefits of fork-activated shifting within a limited volume and without the attendant wear problems caused by the forks.

SUMMARY

In an aspect of the disclosed principles, a split path CVT is provided for selectively providing multiple transmission ratio ranges between a CVT input and a CVT output. In this aspect, one or more of the ratio ranges are shifted by a piston-actuated synchronizer system. The piston-actuated synchronizer system includes a cylindrical collar connected by a spline to a piston sharing a common rotational axis. The collar is also part of the synchronizer assembly. A cylindrical driven gear has a spline associated with it on a second common rotational axis that is coincident with the first common rotational axis. The gear spline is connected to the synchronizer output ring. The gear is supported on the shaft by a bearing and can rotate independently from the shaft. The cylindrical collar, axially movable along the second common rotational axis, engages the synchronizer hub to the synchronizer output ring to engage the shaft to the gear.

A piston is associated with the cylindrical collar. The piston is supported by the hub, which is connected to the shaft, the hub also having one or more fluid inlets formed therein in fluid communication with the cylindrical cavity. The hub is partially enclosed by a manifold. The fluid inlets in the hub coincide with fluid passages in the manifold. The fluid passages in the manifold coincide with fluid passages in the housing. The flow of fluid from the one or more fluid inlets into the cylindrical cavity is regulated by a solenoid valve on the housing to force the piston and the associated cylindrical collar axially toward the synchronizer to engage the synchronizer hub to the synchronizer output ring and therefore to the gear. In an embodiment, a spring is provided for biasing the collar away from the synchronizer engaged position.

Further aspects and features of the disclosed principles will be appreciated from the following detailed description and the accompanying drawings, of which:

DETAILED DESCRIPTION

This disclosure relates to machines requiring a transmission to link a power source to the final ground-engaging mechanism, e.g., wheels, tracks, etc., and/or to another powered function or implement. Examples of such machines include machines used for mining, construction, farming, transportation, or any other industry known in the art. For example, the machine may be an earth-moving machine, such as a wheel loader, excavator, dump truck, backhoe, motor grader, material handler or the like. Moreover, one or more implements may be connected to the machine for a variety of tasks, including, for example, loading, compacting, lifting, brushing, and include, for example, buckets, compactors, forked lifting devices, brushes, grapples, cutters, shears, blades, breakers/hammers, augers, and others.

Figure 1:
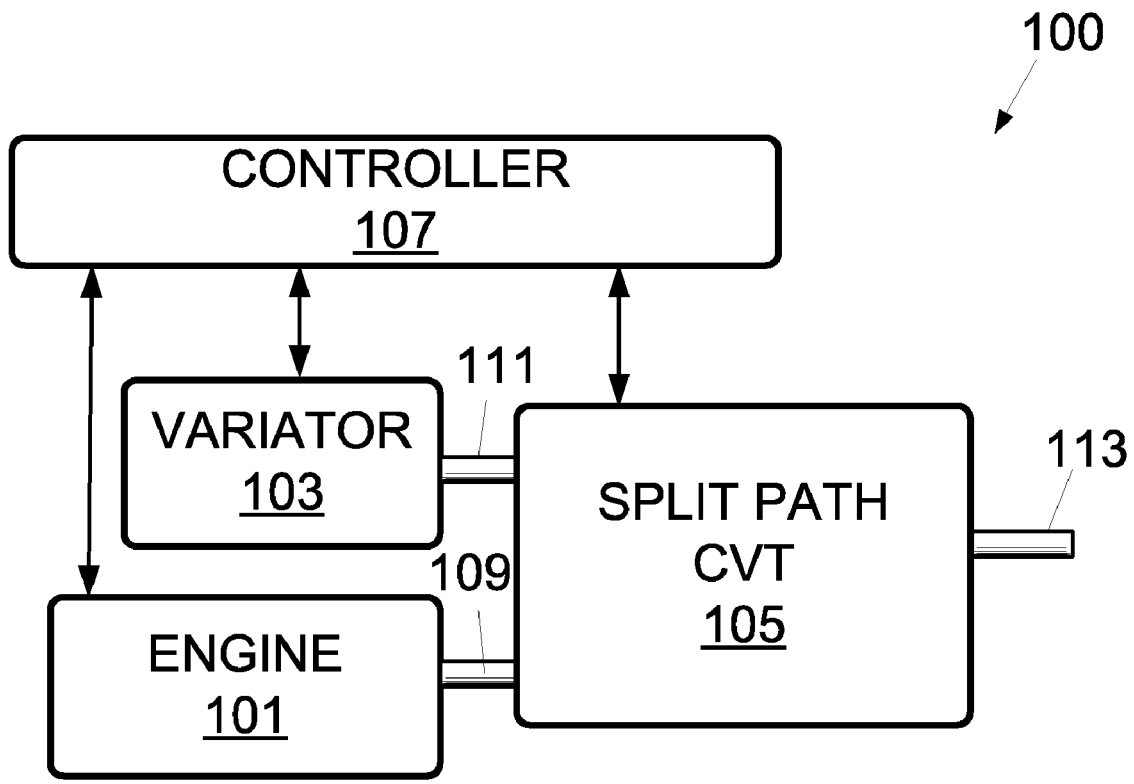
FIG. 1 is a schematic system diagram showing a split path CVT environment within which the disclosed principles may be implemented.

FIG. 1 is a diagrammatic illustration showing a transmission architecture 100 within which embodiments of the disclosed principles may be used. The illustrated transmission architecture 100 includes an engine 101, a variator 103, and a split path CVT 105. In addition, a controller 107 is included in order to coordinate the operation of the engine 101, variator 103, and split path CVT 105. A first output shaft 109 provides a first input from the engine 101 to the split path CVT 105, and a second output 111 provides a second input from the variator 103 to the split path CVT 105. A third output 113 from the split path CVT 105 is provided for linkage to a final drive train or other power transfer system, not shown. The third output 113 provides a weighted combination of the inputs to the split path CVT 105. More precisely, at a given engine speed, the effective transmission ratio of the split path CVT 105 will depend upon the speed and direction of the variator 103 as well as upon a range setting of the split path CVT 105.

The engine 101 is an example of a primary mover, but it will be appreciated that other primary mover systems may be used additionally or alternatively without departing from the scope of the described principles. Similarly, the variator 103 is simply an example of a secondary mover, and it will be appreciated that other types of secondary movers may be used additionally or alternatively without departing from the scope of the disclosed principles of operation.

The operation of the engine 101 is controlled based on one or more inputs, including, for example, an input from a user interface (not shown), e.g., a pedal or lever, as well as an input from the controller 107, e.g., for purposes of torque control, traction control, etc. The operation of the variator 103 is controlled by the controller 107 based on the current and desired state of the split path CVT 105. Finally, the split path CVT 105 is managed by the controller 107 based on a number of parameters including, for example, available engine power and torque, as well as vehicle speed.

The controller 107 may be any computing device capable of sensing one or more conditions of the split path CVT 105, engine 101 and/or variator 103 and providing control outputs to one or more of the split path CVT 105, engine 101 and/or variator 103. By way of example but not limitation, the controller 107 may be integrated with an engine or machine control module, or may be a separate device. The controller 105 operates by reading computer-readable instructions from a computer-readable medium and executing the read instructions. The computer-readable medium may be a tangible medium such as a hard drive, optical disc, jump drive, thumb drive, flash memory, ROM, PROM, RAM, etc., or may be an intangible medium such as an electrical or optical wave form traveling in air, vacuum, or wire.

Although shift forks have traditionally served to execute accurate shift timing in split path CVT architectures, the use of these forks is not without consequence. The forks are non-rotating members that must forcefully interface with rapidly rotating transmission parts to execute a shift. Because rapid shifts are required, high shift loads may be applied, causing substantial wear to the forks and/or the mating transmission surfaces. Such wear necessitates maintenance and repair, both of which can be costly. Typically, the forks and the other associated parts of the system also require a fair amount of spatial volume to accommodate their bulk and range of motion.

Figure 2:
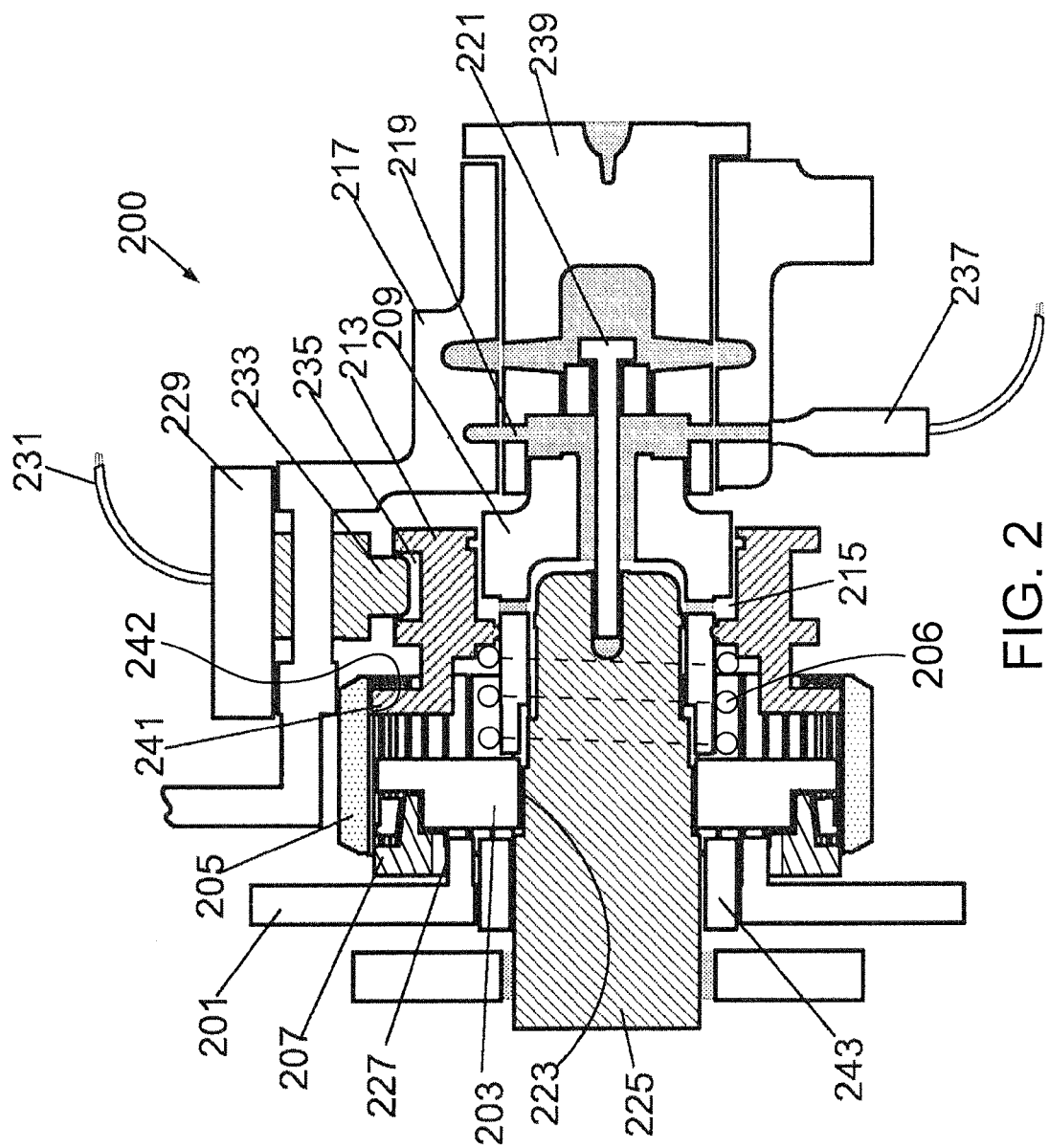
FIG. 2 is a partial cross-sectional side view of a piston-actuated synchronizer system within a split path CVT according to one aspect the disclosed principles, wherein the piston-actuated synchronizer is not engaged.

In an embodiment of the disclosed principles, a piston-actuated shift mechanism is introduced to execute one or more range shifts in the split path CVT 105. Although various configurations may be used without departing from the scope of the disclosed principles, one exemplary configuration is shown in cross-sectional side view in FIG. 2 and FIG. 4. The illustrated piston-actuated shift mechanism 200 includes a cylindrical driven gear 201 and a cylindrical collar 205 that may selectively couple or uncouple the gear 201 to the shaft 225 via the synchronizer 203. The collar 205 surrounds and is keyed to a substantially annular piston 213. The piston 213 is axially slidable on a hub 209, to selectively engage or disengage the driven gear 201 via a spline 207.

A cylindrical compression spring 206 is located between the piston 213 and the synchronizer 203 to bias the assembly including the force collar 205 away from the spline 207. A distal end of the collar 205 furthest from the spline 207 is formed into or joined with the cylindrical piston 213, which fits closely on the hub 209, forming a cylindrical cavity 215 there between. The hub 209 is attached to the shaft 225 by bolt 221. The cylindrical cavity 215 is filled and drained of pressurized hydraulic fluid via one or more fluid inlets 219. The hydraulic fluid is supplied through passages in the manifold 239 and in the housing 217.

Figure 3:
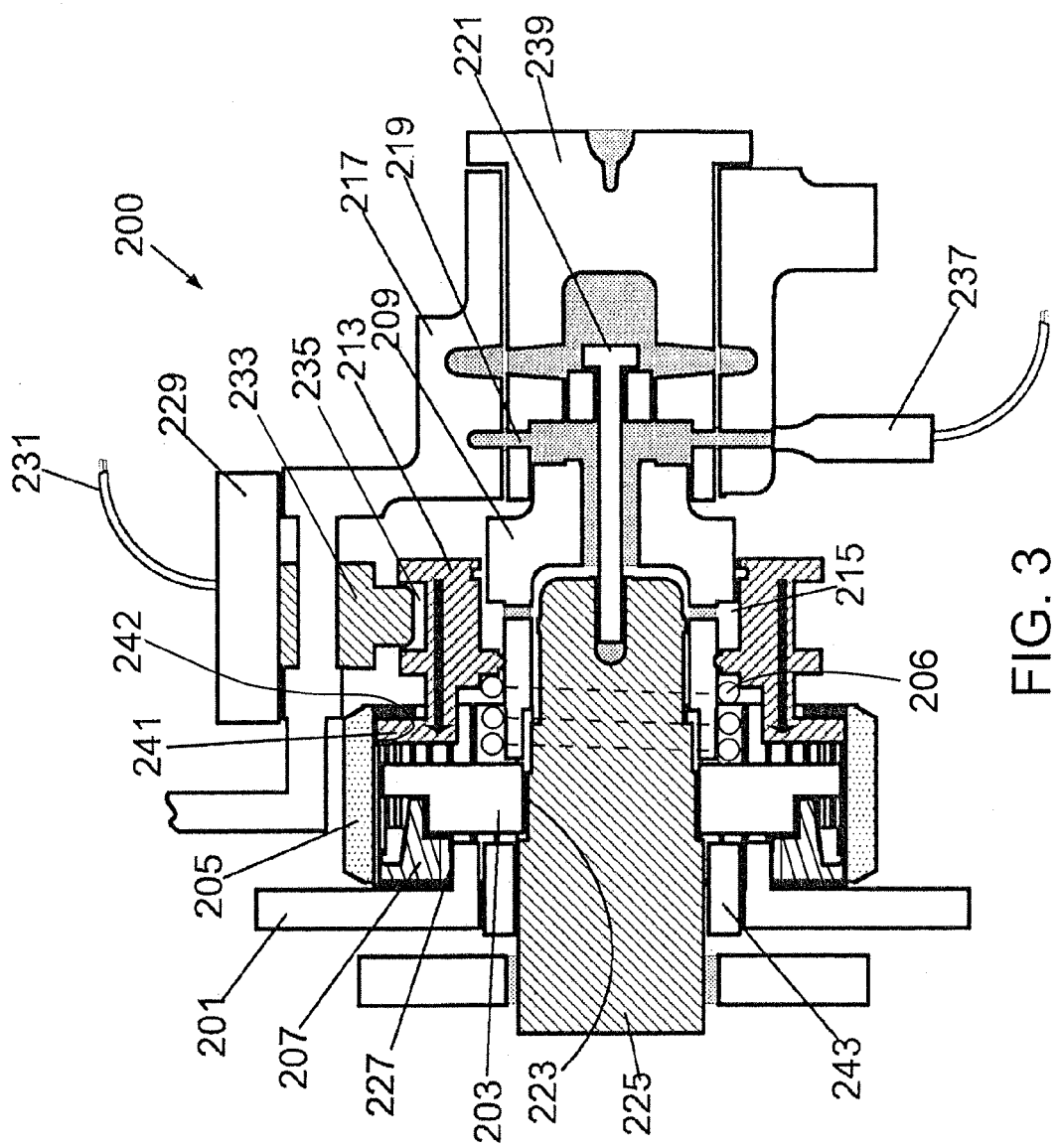
FIG. 3 is a partial cross-sectional side view of a piston-actuated synchronizer system within a split path CVT according to one aspect the disclosed principles, wherein the piston-actuated synchronizer is engaged.

A solenoid valve 237 on the housing 217 is controlled via the controller 107 to regulate the flow of fluid from the one or more fluid inlets 219 into the cavity 215 The solenoid valve 237 may be proportional or binary (switching) and is electronically controlled by a solenoid control signal in an embodiment. However, other types of solenoid control may be used instead, including mechanical or hydraulic control for example. It will be appreciated that as pressurized fluid is introduced into the cavity 215 via the one or more fluid inlets 219, the piston 213 is forced forward, compressing the return spring 206 as in FIG. 3.

The collar 205 has an annular step 242 thereon to engage a flange 241 of the piston 213. Thus, the action of displacing the piston 213 also axially displaces the collar 205 towards the spline 207. If sufficient fluid is introduced into the cavity 215, the displacement of the collar 205 will be such that the collar 205 causes the synchronizer 203 to reduce the relative speed difference of the shaft 225 and the gear 201 to zero. This allows the collar 205 to move axially to engage the spline 207 of the synchronizer output ring which is engaged to the gear 201 through spline 227.

In an embodiment of the disclosed principles, the engagement of the collar 205 with the spline 207 is used as a threshold precondition to further accelerate the shaft 225. This is because any acceleration prior to the engagement of the driven collar 205 with the spline 207 will delay synchronization and will cause excessive wear to the synchronizer friction material.

To this end, a displacement sensor 229 is adapted to detect the axial position of the collar 205 and to convey a signal indicative of the axial position of the collar 205 to the transmission controller 107 via a sensor output 231. The displacement sensor 229 may be of any suitable type and configuration, but in an embodiment of the disclosed principles, the displacement sensor 229 comprises a magnetic sensor. In an alternative embodiment, the displacement sensor 229 comprises a two-state switch. The displacement sensor 229 detects the axial location of the sensor target 233 that is contained in the sensor target keyway 235 in the piston 213. The sensor target 233 is prevented from rotating by the displacement sensor 229.

Figure 4:
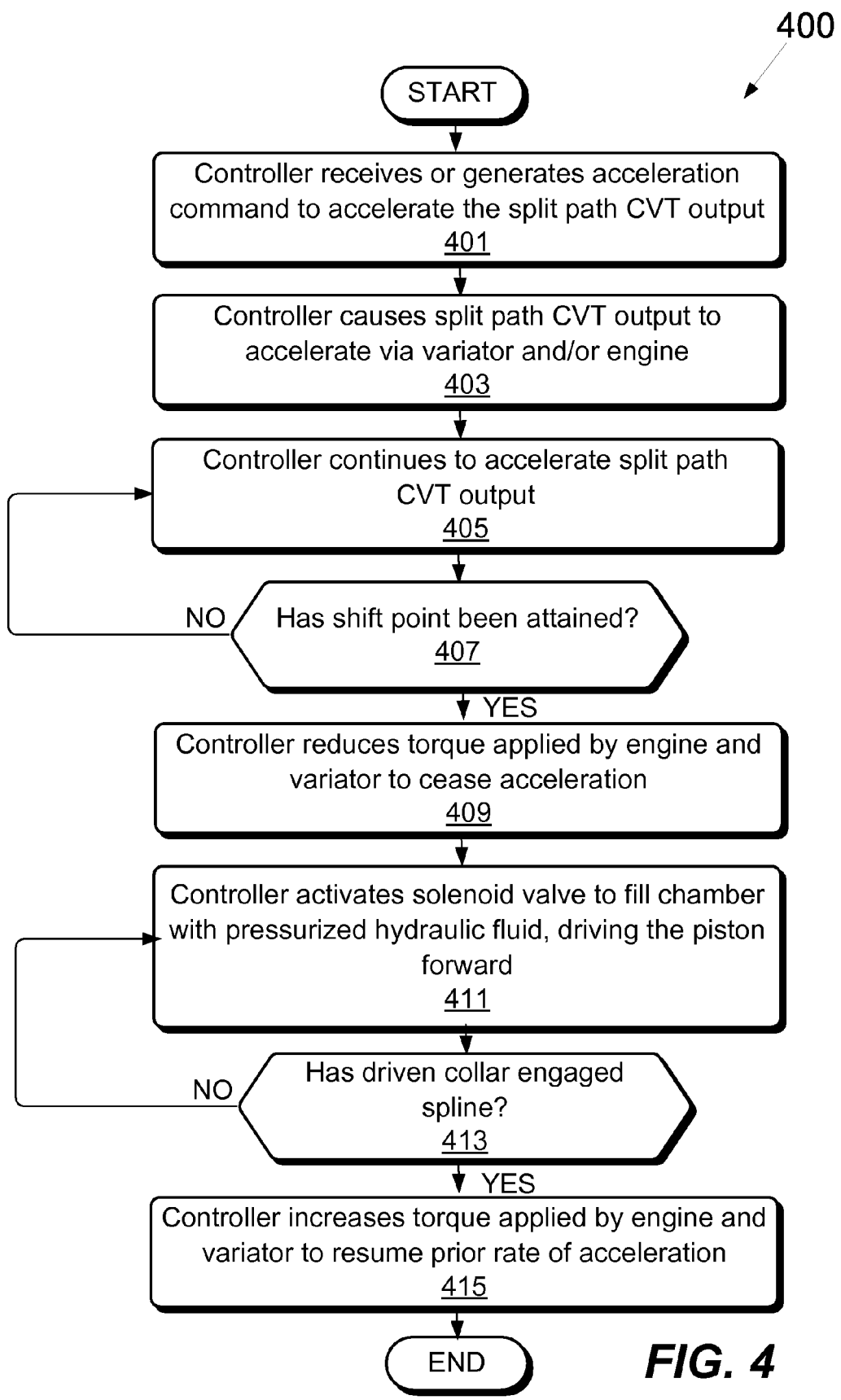
FIG. 4 is a flow chart illustrating a process of range shifting within an embodiment of the disclosed principles.

FIG. 4 is a flow chart illustrating a process of range shifting within an embodiment of the disclosed principles. The illustrated process 400 begins at stage 401, wherein the controller 107 receives or generates an acceleration command to accelerate the split path CVT output. The Controller 107 causes the split path CVT output to accelerate via the variator 103 and/or engine 101 at stage 403. The Controller continues to accelerate the split path CVT output at stage 405. In stage 407, the controller 107 determines whether a shift point has been attained. If such a point has been reached, the Controller 107 first reduces the torque output by the engine 101 and variator 103 at stage 409, and then activates the solenoid valve 237 at stage 409 to fill the chamber 215 with pressurized hydraulic fluid, driving the piston 235 forward.

At stage 413, the controller determines whether the driven collar 205 has engaged the spline 207. This can be determined based on a reading of the signal from the displacement sensor 229. Once it is determined that he driven collar 205 has engaged the spline 207, the controller 107 increases the torque applied by the engine 101 and variator 103 at stage 415 to resume the prior rate of acceleration.

INDUSTRIAL APPLICABILITY

The described principles are applicable to machines requiring a transmission to link a power source to the final ground-engaging mechanism, e.g., wheels, tracks, etc., and/or to another powered function or implement. Examples of such machines include machines used for mining, construction, farming, transportation, or any other industry known in the art. For example, the machine may be an earth-moving machine, such as a wheel loader, excavator, dump truck, backhoe, motor grader, material handler or the like. Exemplary implements include, without limitation, buckets, compactors, forked lifting devices, brushes, grapples, cutters, shears, blades, breakers/hammers, augers, and others.

In this context, the disclosed principles allow rapid shifts in a split path CVT without the replacement and maintenance requirements imposed by the exclusive use of fork shifters. It will be appreciated, however, that a split path CVT generally involves multiple sets of gears that mesh and unmesh to shift the range of the transmission. Moreover, it is contemplated that certain range shifts can still be executed via fork shifters, such that the CVT includes a combination of one or more piston-actuated shift mechanisms as described herein and one or more traditional fork shift mechanisms.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A piston-actuated synchronizer system comprising:
   a cylindrical collar keyed to a cylindrical piston, the cylindrical collar and the cylindrical piston sharing a first common rotational axis;
   a cylindrical driven gear and a spline associated with and fixed to the cylindrical driven gear, the cylindrical driven gear and spline sharing a second common rotational axis, the second common rotational axis being coincident with the first common rotational axis;
   the cylindrical piston being axially movable along the second common rotational axis and having a flange thereon for engaging a step on the cylindrical collar to translate the cylindrical collar axially toward the spline, the cylindrical piston further including an annular keyway formed on an outer surface thereof, the cylindrical piston being supported by a hub with a cylindrical cavity formed between the cylindrical piston and the hub, the cylindrical cavity having at least one fluid inlet in fluid communication therewith;
   a solenoid valve for regulating a flow of fluid from the at least one fluid inlet into the cylindrical cavity to force the cylindrical piston and the associated cylindrical collar axially toward the spline to engage the cylindrical collar therewith, and a spring for biasing the cylindrical driven collar away from the spline;
   a housing having a displacement sensor thereon, the displacement sensor being adapted to detect an axial position of the driven collar and to produce a signal indicative of the axial position of the driven collar; and
   a sensor target positioned between the cylindrical piston and the housing and having a portion positioned within the annular keyway of the cylindrical piston.

2. The piston-actuated synchronizer system according to claim 1, further comprising a synchronizer for synchronizing the shaft and gear relative speeds prior to engagement of the spline and the cylindrical collar.

3. The piston-actuated synchronizer system according to claim 1, wherein the solenoid is an electrically actuated solenoid.

4. The piston-actuated synchronizer system according to claim 3, wherein the electrically actuated solenoid is a switching solenoid.

5. The piston-actuated synchronizer system according to claim 3, wherein the electrically actuated solenoid is a proportional solenoid.

6. The piston-actuated synchronizer system according to claim 1, wherein the displacement sensor comprises a two-state switch.

7. The piston-actuated synchronizer system according to claim 1, wherein the annular keyway is keyed to a switch projection projecting from the displacement sensor.

8. The piston-actuated synchronizer system according to claim 1, wherein the displacement sensor comprises a magnetic sensor.

9. The piston-actuated synchronizer system according to claim 8, further comprising a controller communicably linked to the sensor output to receive the signal indicative of the axial position of the collar, the controller also being communicably linked to the solenoid valve to regulate the flow of fluid into the cylindrical cavity for selectively controlling the engagement of the cylindrical collar and the spline.

10. The piston-actuated synchronizer system according to claim 1, further comprising a controller communicably linked to the sensor output to receive the signal indicative of the axial position of the collar, the controller also being communicably linked to the solenoid valve to regulate the flow of fluid into the cylindrical cavity for selectively controlling the engagement of the cylindrical collar and the spline.

11. The piston-actuated synchronizer system according to claim 1, wherein the cylindrical cavity formed between the cylindrical piston and the hub is axially elongated and the at least one fluid inlet extends in a radial direction.

* * * * *